C. L. REDFIELD.
TYPE DIE FOR MATRIX MAKING MACHINES.
No. 11,335. Reissued May 16, 1893.
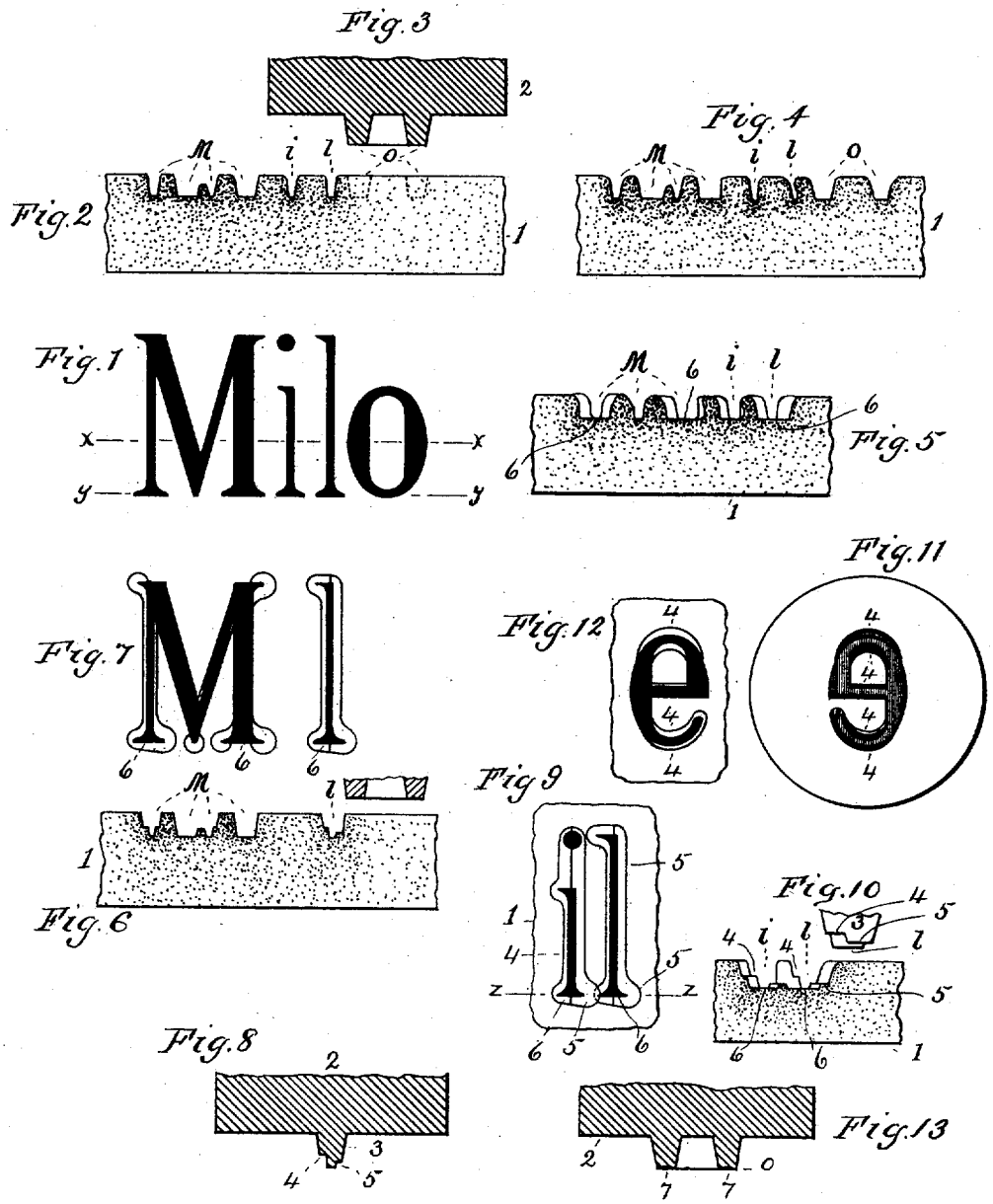
Witnesses
R. Blume
C. Patchin.
Inventor
Casper L. Redfield
By his Attorney P. H. Gunckel
THE NORRIS PETERS CO., PHOTO-LITHO., WASHINGTON, D. C.

UNITED STATES PATENT OFFICE.

CASPER L. REDFIELD, OF CHICAGO, ILLINOIS, ASSIGNOR TO THE CHICAGO MATRIX MACHINE COMPANY.

TYPE-DIE FOR MATRIX-MAKING MACHINES.

SPECIFICATION forming part of Reissued Letters Patent No. 11,335, dated May 16, 1893.

Original No. 416,740, dated December 10, 1889. Application for reissue filed May 27, 1891. Serial No. 394,060.

*To all whom it may concern:*

Be it known that I, CASPER L. REDFIELD, a citizen of the United States, residing at Chicago, in the county of Cook and State of Illinois, have invented certain new and useful Improvements in Type-Dies for Matrix-Making Machines; and I do hereby declare that the following is a full, clear, and exact description of the same, reference being had to the accompanying drawings.

My invention relates to type-dies used for making impressions in a matrix-body, from which stereotype-plates may be cast to be used for printing, and more particularly to the dies used in matrix-making machines that form the impressions by the successive operation of single dies.

The objects of the invention are, first, to so construct the dies that the impression made by one die will not be injured by the impression made by the next succeeding die, and, second, that the faces of the die will make sharp outlines to the characters impressed, so that the stereotype-plates cast from the matrices will give clean-cut and clear prints.

In making matrices by the use of ordinary type-dies that are successively impressed in the matrix-body it is found that frequently where the impressions are close together the die last operated crowds material of the matrix-body into the impression next preceding, so as to form a defective matrix and render it impossible to cast therefrom a stereotype-plate with letters and characters all perfect. The impressions, to enable a suitable stereotype-plate to be formed, must have a considerable depth in the matrix-body as compared with the size of the face of the characters themselves, and in using dies as ordinarily constructed the portions of the letters constituting the hair lines form such narrow impressions that in casting from the matrix "cold-short" occurs and the plate is rendered defective. This difficulty is aggravated where a hair-line is immediately followed by a wide stem of the next letter, for some of the matrix-body is liable to be crowded over into the former impression, making it still narrower. I overcome these difficulties by forming shoulders around the hair-lines back of the face of the die and in the portion that penetrates the matrix-body. These shoulders have the effect of widening the main body of the impression without disturbing the face portion and effect three important results—first, a sufficient width of impression near the face is made to avoid "cold-short" in casting; second, that portion of the matrix body which the next die would be likely to crowd over into the preceding impression is removed, and, third, the matrix-body is hardened and solidified around the face of the letter and renders any swell or spring in the matrix-body less liable to distort or injure the impression. These results are best accomplished by making the shoulder on the forward edge—that is the edge next to which the following impression comes—somewhat wider and nearer the face of the letter than the shoulder at the rear edge. The reason of this is that the purpose of the shoulder on the rear edge of the letter is only to widen the general impression, while that on the front edge has not only to widen the body of the impression, but to clear the way so that the next die will not injure the face of the earlier impression. As the rear shoulder of a second letter strikes near or over the front edge of the first impression, the result is that whatever bulk of matrix material is crowded over has a space into which it can go without injury to the face of the print. On such letters as do not have hair-lines coming next to the succeeding impression, as M and e, for instance, the shoulders may be alike on both sides. In a series of letters, large and small, the width and amount of shoulder for the small letters should be proportionately larger than on the large letters. This not only reduces the liability of the large letters injuring the smaller ones, but makes the resistance of the matrix-body offered to letters of different sizes more nearly equal, and renders it less difficult to insure a like depth of impression for all letters, whether large or small.

In using ordinary type-dies having their faces flat it is frequently found that the matrices formed therefrom will not have clear-cut and well-defined characters in the impressions, because, first, the inner corners tend to draw up, and, second, the continued use of the dies tends to wear off the edges forming the outlines of the letters, and the resiliency of the matrix material tends to increase the defect. This difficulty is obviated by making the faces of the dies slightly concave in cross-section.

In the accompanying drawings, the word "Milo," shown in Fig. 1, is selected for illustrating my improvements. Fig. 2 shows a vertical section of a matrix, in which the letters "M—i—l" have been impressed; and Fig. 3 a sectional view of a die in position to impress the letter "o" in the matrix, the proposed impression being shown by dotted lines. The impressions shown in Fig. 2 are such as are desired to be made by dies cut in the ordinary manner, and are assumed to be approximately perfect. Fig. 4 shows, in a like sectional view of the matrix, the distortion of material that experience teaches is likely to occur; and Fig. 5 a section of the matrix on the line *y—y*, showing a probable distortion and displacement of the matrix material about the feet of the letters Fig. 6 is a section on the same plane as Fig. 2 of a matrix in which are impressed the letters "M—l," and showing a vertical section of the head of the die for forming the letter "o," as the same would be formed by the use of my improvements. Fig. 7 shows the letters "M—l" and their shoulders as they would appear on the matrix. Fig. 8 shows a central transverse section of the die for the letter "l." Fig. 9 is a plan view of the matrix, showing only the letters "i—l;" and Fig. 10 is a sectional view of the same on the line *z—z* of Fig. 9, showing a portion of the die for the letter "l" in position to descend. Fig. 11, shows the face of the die for the letter "e;" Fig. 12 the matrix-impression produced thereby; and Fig. 13 is a vertical section of a die for the letter "o," showing the concave form of face.

In said drawings 1 indicates a matrix-body, and 2 the bodies of the type-dies. These are shown on a scale enlarged many times beyond the sizes used in ordinary printing, for the purpose of more clearly illustrating the improvements. The letters of the selected word "Milo" are indicated on the dies and matrices by the corresponding letters "M—i—l—o." The portion 3 of the die that projects from the die-body on which the letter is cut and which penetrates the matrix material has shoulders 4 and 5, that form corresponding shoulders in the matrix. The shoulders 4 are those of less width and farther from the faces of the letters. The shoulders 5 are those of the greater width and closer to the faces of the letters. The former are provided at the left side of narrow stems that will occupy advanced positions on the matrix and at both sides of such lines as are in rear of such position as the two thinner lines of the letter "M." The latter (the shoulders 5) are provided at the right or outer sides of narrow stems occupying the advance position, as shown in the letter "l" in Fig. 7 and "i—l" in Fig. 9, so that as one letter is impressed its narrower and shallower shoulder will adjoin the wider and deeper shoulder of the last preceding impression. Thus, as more clearly shown in Figs. 9 and 10, the wider and deeper shoulder 5 of the letter "i" is overlapped at the foot 6 by the narrower and shallower shoulder 4 of the letter "l;" but the former having been first impressed the latter will not crowd material over sufficiently to injure the face of the former impression. If, following these impressions, the suspended die 2, (an "i" or an "l,") having a similar shouldered foot 6, were depressed the wider shoulder 5 at the right in the matrix would permit the narrow shoulder 4 of the die to crowd material over to the left to some extent without injury to the face of the preceding die-impression. The impressions are thus somewhat widened back of the face. The matrix material thereabout is firmly impacted and spaces of sufficient width produced to insure perfect letters on the stereotype-plates cast from such matrices. The shoulders 4 and 5 are made proportionately larger for small than large letters.

A sharp outline may be given the face of the impressions in the matrix by making the faces of the letters on the dies slightly concave between the sides, as illustrated at 7 in Fig. 13.

What I claim is—

1. A type-die having its hair lines protected by a shoulder parallel to the type-face.

2. A type-die having shoulders on the front and rear edges parallel to the face, the front shoulders being nearer the face than the rear shoulders.

3. A type-die having shoulders on the front and rear edges parallel to the face, the front shoulders being wider than the rear shoulders.

4. A type-die having shoulders on the front and rear edges parallel to the face, the front shoulders being wider and nearer the face than the rear shoulders.

5. A type-die having the stem or stems of the character on its face transversely concave.

6. A type-die for matrix making having shoulders extending laterally from its sides and varying in width and distance from the type-face.

7. A type-die for matrix-making, having shoulders varying in width and distance from the face and having the stem or stems of the character on the face concave in cross-section, substantially as set forth.

8. A type-die having a shoulder projecting from its base a shorter distance than the type-face.

9. A type-die having an impression face projecting from its base and provided with a lateral shoulder on a line with such base, substantially as set forth.

10. A type-die having inclined walls on its impression surface and provided with a lateral extension or shoulder, substantially as set forth.

11. A type-die having a shoulder or shoulders on its penetrating portion parallel to its face for the purpose set forth.

12. A type-die having a shoulder on its penetrating portion adapted to compress material in downward direction only and to less depth than the type-face.

CASPER L. REDFIELD.

Witnesses:
E. B. SPRINGER,
W. B. SHARP.